Oct. 14, 1924.  1,511,278
H. B. HUBBARD
WHEEL LIFTING RIM
Filed April 6, 1923
Fig. 1.
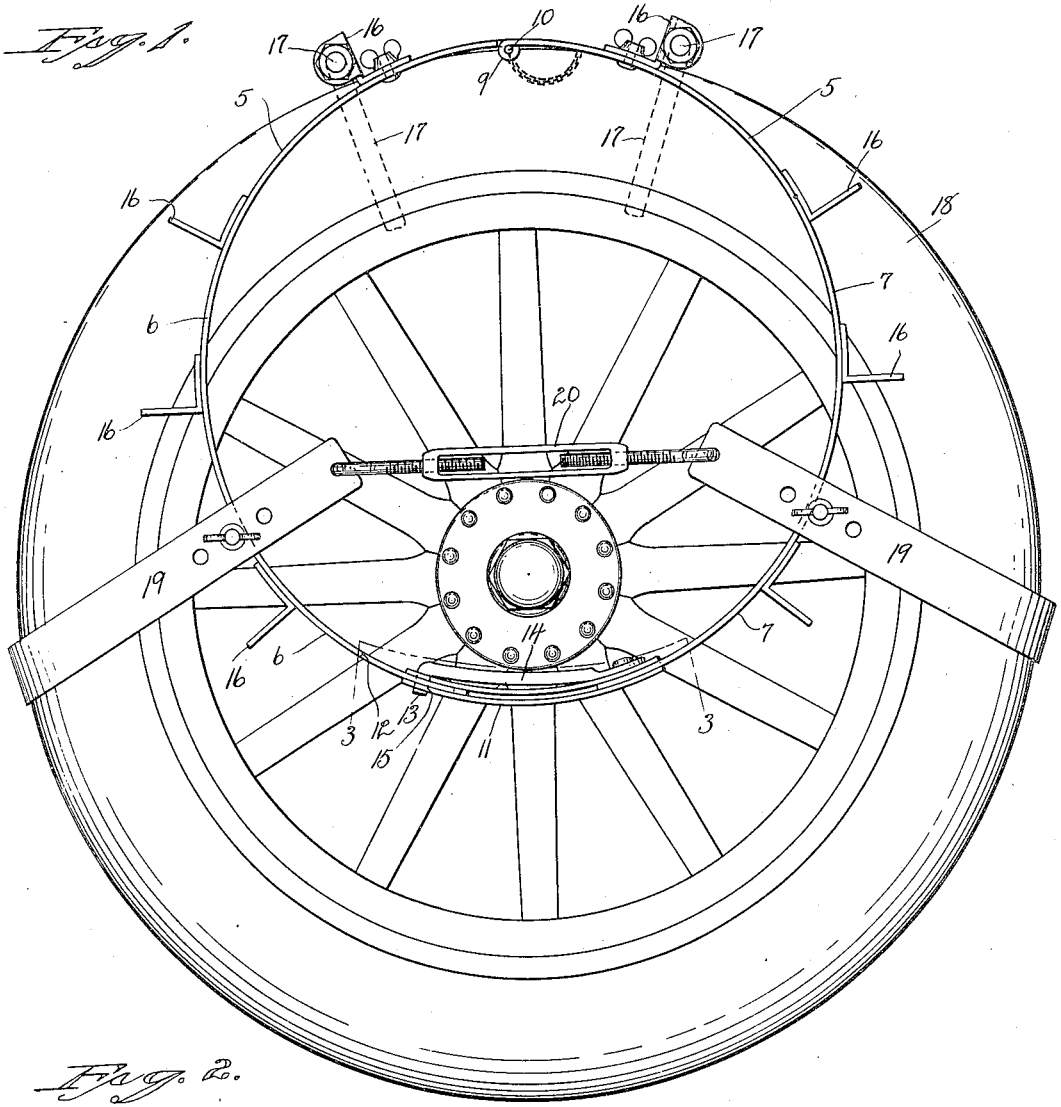
Fig. 2.
Fig. 3.
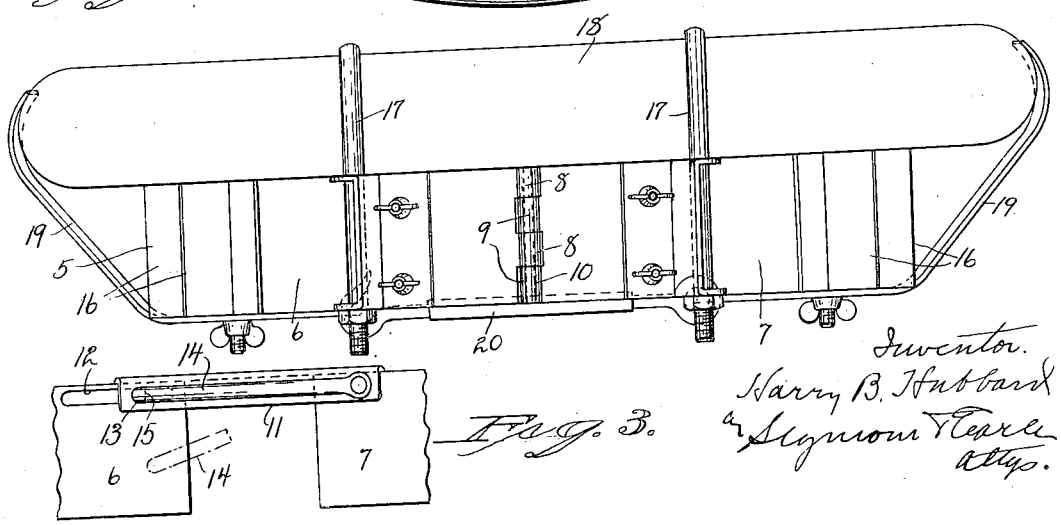
Inventor.
Harry B. Hubbard
by Seymour Pearle
attys.

Patented Oct. 14, 1924.

1,511,278

UNITED STATES PATENT OFFICE.

HARRY B. HUBBARD, OF WEST HAVEN, CONNECTICUT.

WHEEL-LIFTING RIM.

Application filed April 6, 1923. Serial No. 630,203.

*To all whom it may concern:*

Be it known that I, HARRY B. HUBBARD, a citizen of the United States, residing at West Haven, in the county of New Haven and State of Connecticut, have invented a new and useful Improvement in Wheel-Lifting Rims; and I do hereby declare the following, when taken in connection with the accompanying drawings and the characters of reference marked thereon, to be a full, clear, and exact description of the same, and which said drawings constitute part of this application, and represent, in—

Fig. 1 a side view of a wheel-lifting rim constructed in accordance with my invention.

Fig. 2 a top view of the same.

Fig. 3 a broken plan view of the lower ends of the rim-members, illustrating how they are connected together.

This invention relates to improvement in wheel-lifting rims, that is, a device adapted to be applied to one or more wheels of a motor vehicle when the wheels of such vehicle have been embedded in a rut or a hole. The object of the invention is to provide a device which is adapted to be applied to disk wheels as well as spoke wheels, and which may be readily applied and removed when required, and the invention consists in the construction as hereinafter described and particularly recited in the claims.

In carrying out my invention, I employ an auxiliary rim 5 comprising two segmental members 6 and 7, preferably formed from flat metal of suitable thickness to give the required strength. These members are formed at one end with knuckles 8 and 9, through which a pin 10 may be passed to hinge the two ends together. To the opposite or inner end of one of the members, as 7, a U-shaped clip 11 is fixed, so as to project beyond the end of the member to receive the inner end of the other member 6, which is provided with a slot 12 to be entered by the nose 13 of a latch 14, which is pivotally connected with the clip 11, which clip has a clearance-hole 15, through which the nose 13 passes into the slot 12, so as to adjustably connect the inner ends of the members. The members are provided with a plurality of outwardly-extending gripping-arms 16, and the two members are provided, near their hinged ends, with clamping-arms 17, which extend over the tire 18 of a vehicle wheel,—these clamps being adjustable for various sizes of wheel-rims. Also pivotally connected with the members are clamping-braces 19, which are also adjustable and adapted to grip the surfaces of tires of different widths. These clamping-braces 19 are adjustable and their inner ends, which project within the auxiliary rim, are connected by a turn-buckle 20.

If a vehicle wheel sinks into a rut or hole, my auxiliary rim may be readily connected with the wheel which is in the depression, so that the lower surface of the rim will secure a bearing, and this may be provided by placing a board beneath the auxiliary rim. If the motor is then started, to turn the wheel, the weight of the vehicle is transferred from the main wheel to the auxiliary wheel, and as this turns, will lift the vehicle wheel out of the depression. This auxiliary rim being eccentric to the wheel to which it is applied, permits the vehicle to be moved forward or backward. It is obvious, however, that the curvature of the auxiliary rim may be varied or the clamping-braces adjusted, so as to move the auxiliary rim forward or backward as occasion may demand.

I claim:

1. A wheel-lifting rim, comprising two segmental members hinged together at one end and adjustably connected at the opposite end, the said auxiliary rim provided with outwardly-projecting rims, and provided with adjustable clamps adapted to hook over the tire of a wheel, and also provided with adjustable clamping-braces also adapted to engage with the wheel tire.

2. A wheel-lifting rim, comprising two members hinged together at one end, one of said members provided at the opposite end with a clip into which the end of the other member extends, a latch for coupling the said ends, and clamps adjustably connected with said auxiliary rim and adapted to engage with the tire of a vehicle wheel, whereby said rim is eccentrically connected to one side thereof.

In testimony whereof, I have signed this specification in the presence of two subscribing witnesses.

HARRY B. HUBBARD.

Witnesses:
FREDERIC C. EARLE,
FLORENCE H. MONK.